(12) United States Patent
Kelly et al.

(10) Patent No.: US 10,528,113 B2
(45) Date of Patent: *Jan. 7, 2020

(54) LOW LATENCY COMPUTER SYSTEM POWER REDUCTION

(71) Applicant: Microsoft Technology Licensing, LLC, Redmond, WA (US)

(72) Inventors: Bryan D. Kelly, Redmond, WA (US); Badriddine Khessib, Redmond, WA (US); Sriram Govindan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 99 days.

This patent is subject to a terminal disclaimer.

(21) Appl. No.: 15/811,015

(22) Filed: Nov. 13, 2017

(65) Prior Publication Data

US 2018/0067537 A1 Mar. 8, 2018

Related U.S. Application Data

(63) Continuation of application No. 14/318,342, filed on Jun. 27, 2014, now Pat. No. 9,817,465.

(51) Int. Cl.
*G06F 1/3234* (2019.01)
*G06F 1/3203* (2019.01)
*G06F 1/324* (2019.01)
*G06F 1/30* (2006.01)
*G06F 1/3206* (2019.01)

(52) U.S. Cl.
CPC ............. *G06F 1/3234* (2013.01); *G06F 1/30* (2013.01); *G06F 1/3203* (2013.01); *G06F 1/324* (2013.01); *G06F 1/3206* (2013.01); *Y02D 10/126* (2018.01)

(58) Field of Classification Search
CPC ........ G06F 1/3234; G06F 1/3206; G06F 1/30; G06F 1/3203; G06F 1/324
See application file for complete search history.

(56) References Cited

U.S. PATENT DOCUMENTS

| 7,012,454 B2 | 3/2006 | Matsui et al. |
| 7,392,413 B2 | 6/2008 | Shikata |
| 7,519,843 B1 | 4/2009 | Buterbaugh et al. |

(Continued)

FOREIGN PATENT DOCUMENTS

| EP | 1679576 A2 | 7/2006 |
| EP | 2703944 A2 | 3/2014 |

OTHER PUBLICATIONS

"HP Proliant Intel-based 300-series G6 and G7 servers", Retrieved from: <<https://support.hpe.com/hpsc/doc/public/display?docId=emr_na-c00502616>>, Apr. 2010, 23 Pages.

(Continued)

*Primary Examiner* — Vincent H Tran
(74) *Attorney, Agent, or Firm* — Davin Chin; Chin IP, PLLC

(57) ABSTRACT

Technology for handling overcurrent conditions on electrical circuits that power multiple computing modules is disclosed. Aspects of the technology include a power system adapted to provide notifications of overcurrent conditions, and computing modules adapted to reduce an operating speed thereof in response to notification of an overcurrent condition.

20 Claims, 6 Drawing Sheets

(56) References Cited

U.S. PATENT DOCUMENTS

| | | | |
|---|---|---|---|
| 8,464,080 B2 | 6/2013 | Archibald et al. | |
| 8,595,515 B1 | 11/2013 | Weber et al. | |
| 8,627,123 B2 | 1/2014 | Jain et al. | |
| 8,726,057 B2 | 5/2014 | Allen | |
| 9,817,465 B2 * | 11/2017 | Kelly | G06F 1/3203 |
| 2001/0003207 A1 | 6/2001 | Kling et al. | |
| 2005/0086545 A1 * | 4/2005 | Breen | G06F 1/263 |
| | | | 713/300 |
| 2005/0216245 A1 | 9/2005 | Hobson | |
| 2006/0253633 A1 | 11/2006 | Brundridge et al. | |
| 2009/0222681 A1 | 9/2009 | Adachi | |
| 2009/0282274 A1 | 11/2009 | Langgood et al. | |
| 2010/0083007 A1 | 4/2010 | Howard et al. | |
| 2010/0083009 A1 | 4/2010 | Rotem et al. | |
| 2012/0239875 A1 | 9/2012 | Fossum et al. | |
| 2013/0173082 A1 * | 7/2013 | Pippin | G06F 1/206 |
| | | | 700/299 |
| 2014/0006833 A1 | 1/2014 | Ma et al. | |
| 2014/0068299 A1 | 3/2014 | Koinuma et al. | |
| 2014/0089698 A1 | 3/2014 | Ng et al. | |
| 2014/0173305 A1 | 6/2014 | Uan-Zo-Li et al. | |
| 2014/0208139 A1 | 7/2014 | Hatamori | |

OTHER PUBLICATIONS

"Non-final Office Action Issued in U.S. Appl. No. 14/318,342", dated Mar. 16, 2016, 18 Pages.

"Non-final Office Action Issued in U.S. Appl. No. 14/318,342", dated Aug. 25, 2016, 20 Pages.

"Non-final Office Action Issued in U.S. Appl. No. 14/318,342", dated Jan. 19, 2017, 16 Pages.

"Notice of Allowance Issued in U.S. Appl. No. 14/318,342", dated Jul. 11, 2017, 5 Pages.

Das, et al., "Autonomic Multi-Agent Management of Power and Performance in Data Centers", In Proceedings of the 7th International Joint Conference on Autonomous Agents and Multiagent Systems: Industrial Track, May 12, 2008, 8 Pages.

Lefurgy, et al., "Power Capping: a Prelude to Power Shifting", In Journal of Cluster Computing, vol. 11, Issue 2, Jun. 1, 2008, 20 Pages.

Murray, Robert, "Power Management in the Cisco Unified Computing System: An Integrated Approach", In White Paper of CISCO, Apr. 20, 2013, 13 Pages.

"International Preliminary Report on Patentability Issued in PCT Application No. PCT/US2015/037557", dated Sep. 16, 2016, 10 Pages.

"International Search Report & Written Opinion Received for PCT Application No. PCT/US2015/037557", dated Sep. 10, 2015, 13 Pages.

"Second Written Opinion Issued in PCT Application No. PCT/US2015/037557", dated May 31, 2016, 9 Pages.

Pelley, et al., "Power Routing: Dynamic Power Provisioning in the Data Center", In Proceedings of the Fifteenth Edition of ASPLOS on Architectural Support for Programming Languages and Operating Systems, Mar. 13, 2010, 12 Pages.

* cited by examiner

LOW LATENCY COMPUTER SYSTEM POWER REDUCTION

BACKGROUND

The recent rise of online services has led a significant increase in the development, expansion, and improvement of data centers and similar technologies. Such data centers may be used, for example, to provide cloud computing services, facilitate popular social media services, or to provide infrastructure for e-commerce and other web sites.

A typical modern data center may include thousands, tens of thousands, hundreds of thousands, or more servers or other computing devices. A data center may also include supporting equipment such as switches, routers, input/output equipment, temperature management equipment, and/or the like. A data center also typically includes equipment for powering the computing devices and the supporting equipment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technology for handling overcurrent conditions on electrical circuits that power multiple computing modules is disclosed. Aspects of the technology include a power system adapted to provide notifications of overcurrent conditions, and computing modules adapted to reduce an operating speed thereof in response to notification of an overcurrent condition.

As one non-limiting example, the disclosed technology may be employed to enable the computing modules to reduce the draw on the electrical circuit during an overcurrent tolerance period during which a circuit breaker continues to power the electrical circuit even though the draw on the electrical circuit is over a continuous current rating of the circuit breaker.

Other aspects of and applications for the disclosed technology will be appreciated upon reading and understanding the attached FIGUREs and description.

BRIEF DESCRIPTION OF THE DRAWINGS

Non-limiting and non-exhaustive embodiments of the present invention are described with reference to the following drawings. In the drawings, like reference numerals may refer to like parts throughout the various FIGUREs unless otherwise specified. These drawings are not necessarily drawn to scale.

For a better understanding of the present invention, reference will be made to the following Detailed Description, which is to be read in association with the accompanying drawings, wherein.

DETAILED DESCRIPTION

Figure 1:
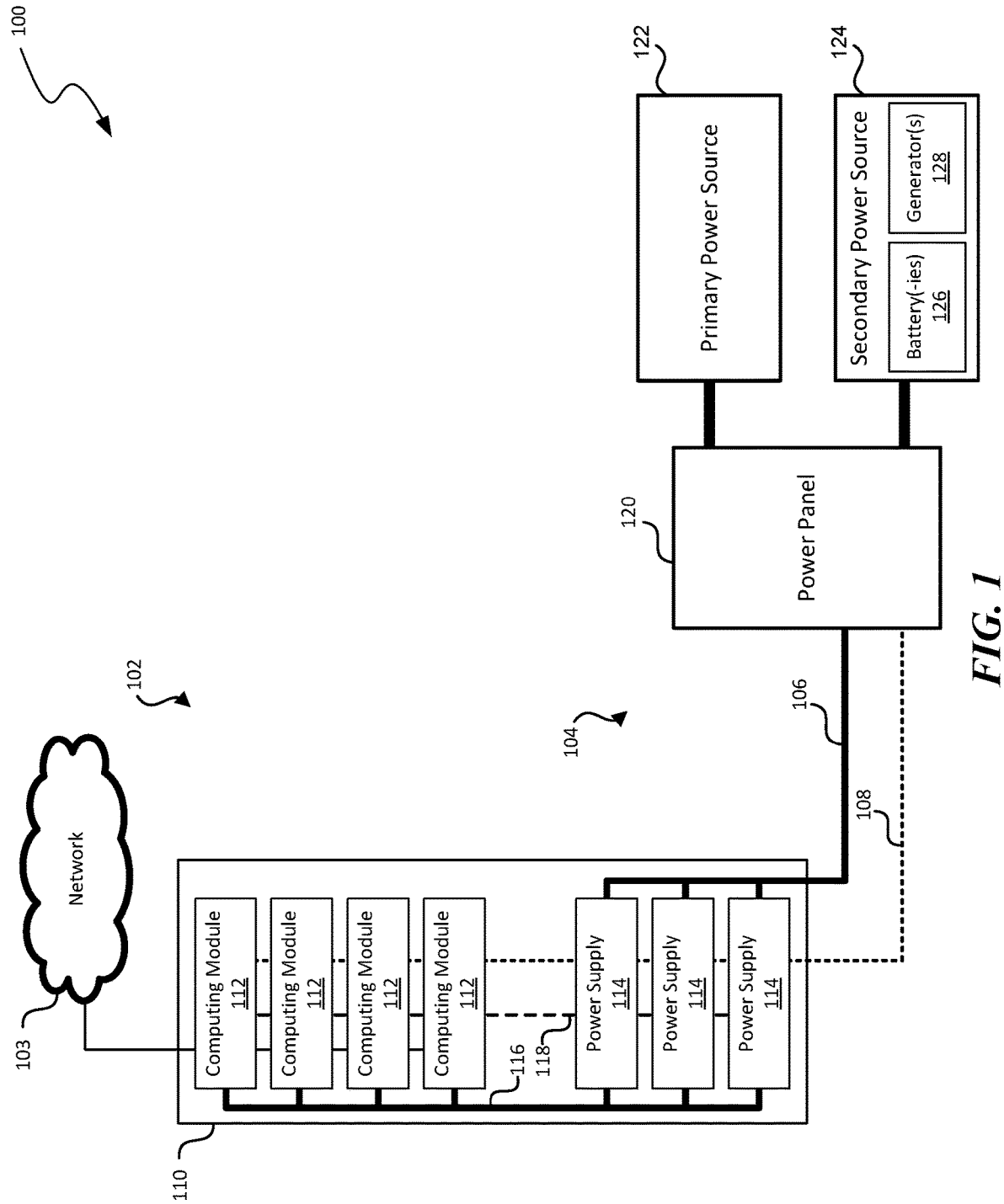
FIG. 1 is a block diagram illustrating an example of an environment having a computing system and a power system in accordance with the disclosed technology.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of embodiments of the technology. It is intended that the terminology used in this disclosure be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section. For example, the term "based on" or "based upon" is not exclusive and is equivalent to the term "based, at least in part, on" and includes being based on additional factors, some of which are not described herein. As used herein, the term "connected," "coupled," or any variant thereof means any connection or coupling, either direct or indirect, between two or more elements. References in the singular are made merely for clarity of reading and include plural references unless plural references are specifically excluded. Any signal referred to herein may be either an "active high" signal or an "active low" signal. The term "or" is an inclusive "or" operator and is equivalent to the term "and/or" unless specifically indicated otherwise. As used herein, the terms "component" and "system" are intended to encompass hardware, software, or various combinations of hardware and software. Thus, for example, a system or component may be a process, a process executing on a computing device, the computing device, or a portion thereof.

Technology for handling overcurrent conditions on electrical circuits that power multiple computing modules is disclosed. Aspects of the technology include a power system adapted to provide notifications of overcurrent conditions, and computing modules adapted to reduce an operating speed thereof in response to notification of an overcurrent condition.

As one non-limiting example, the disclosed technology may be employed to enable the computing modules to reduce the draw on the electrical circuit during an overcurrent tolerance period during which a circuit breaker continues to power the electrical circuit even though the draw on the electrical circuit is over a continuous current rating of the circuit breaker.

In typical data centers, electrical capacity is provisioned based on conservative power consumption values. Accordingly, wiring, circuit breakers, power supplies, energy storage and/or generation equipment, and/or the like are typically designed for "worst case" power consumption, i.e., the expected power draw if all computing modules at the facility operate at peak loads at the same time. As this worst case consumption rarely, if ever, occurs, such provisioning may result in a substantial amount of "stranded" power, i.e., power that is provisioned but will not be used.

In addition, the status of a power system may be monitored at a data center management office or other location. For example, some power system components can provide status reports, warning, errors, and other notifications over a network. However, there may be substantial latency between the time a notification is transmitted by the power system component and the time it is received at the management office. Due to this latency, a notification of an overcurrent condition at a circuit breaker may be a de facto notification that the circuit breaker has tripped by the time the notification is handled at the management office. In other words, the circuit breaker may have already tripped even if the notification was merely an indication that the draw on an electrical circuit should be reduced to avoid tripping the circuit breaker.

Aspects of the disclosed technology may address these and other non-idealities associated with the typical provisioning of power in data centers. For example, the disclosed technology may enable power system components to be more efficiently provisioned. In the rare event that computing modules draw more power than an electrical circuit can continuously provide, the power system may provide a notification to the computing modules of an overcurrent condition. The computing modules may then reduce an operating speed thereof or otherwise reduce power consumption. In this fashion, computing modules may avoid tripping circuit breakers.

FIG. 1 is a block diagram illustrating environment 100 in accordance with the disclosed technology. As shown in FIG. 1, environment 100 includes computing system 102 and power system 104. In addition, computing system 102 and power system 104 are connected to each other via electrical circuit 106 and overcurrent notification signal 108. Even though certain components of environment 100 are shown in FIG. 1, in other embodiments, other environments may include other suitable components in similar or different arrangements, an example of which is described below in conjunction with FIG. 5. In addition, computing system 102 and/or power system 104 may be installed at a data center or other facility.

As shown in FIG. 1, computing system 102 includes fixture 110 having multiple computing modules 112 and multiple power supplies 114. Fixture 110 may have any suitable shape and size, and fixture 110 may also be a chassis (e.g., a fixture occupying a fraction of a rack). However, fixture 110 may alternately be a rack or another type of fixture. Although only one fixture is shown in FIG. 1, in other examples, a computing system may include two, three, four, or any other suitable number of fixtures and/or other types of housings.

Computing modules 112 may be server computing devices in a multi-server computing system. For example, computing modules 112 may be one of many server computing devices in a data center. Computing modules 112 may operate as web servers, application servers, database servers, file servers, and/or the like. In other examples, computing modules 112 may include routers, switches, analog/digital input/output modules, modems, and/or other suitable components. Other examples of computing modules include general- or specific-purpose computing devices, client computing devices, logic processors, network interface cards, and data storage devices. However, computing modules 112 may include virtually any electronic apparatus adapted to perform logic comparisons, arithmetic calculations, electronic communications, electronic input/output, and/or other functions. Although FIG. 1 shows four computing modules in fixture 110, one, three, six, or any other suitable number of computing modules may be in a fixture.

Computing modules 112 may also be coupled to network 103, e.g., to facilitate communications with each other and/or other computing modules. For example, network 103 may enable communications over a wired medium (e.g., twisted pair wire, coaxial cable, untwisted pair wire, or optical fiber), a wireless medium (e.g., microwave spectrum, radio frequency spectrum, or infrared spectrum), or a combination of wired and wireless media. Network 103 may operate according to Ethernet, token ring, asynchronous transfer mode, cellular, WI-FI, Bluetooth, Infrared Data Association (IrDA), near field communication (NFC), ultra-wide band, and/or other suitable protocols. In addition, network 103 may also include routers, switches, modems, and/or other suitable computing/communications components in any suitable arrangements.

Computing modules 112 are also adapted to reduce their power consumption in response to a notification from power panel 120 (e.g., via overcurrent notification signal 108) and/or from power supplies 114 (e.g., via power supply notification signal 118). For example, computing modules 112 may be adapted to reduce an operating frequency or other operating speed of a processor or other processing circuit in response to a notification. In addition, overcurrent notification signal 108 and/or power supply notification signal 118 may be dedicated signals, e.g., employing dedicated wiring, interfaces, pins, hardware, and/or the like. In addition, overcurrent notification signal 108 and/or power supply notification signal 118 may employ any suitable signaling technology. For example, these signals may be 10 Volt signals driven by outputs of power panel 120 and power supply 114.

In operation, use of dedicated/hardwired outputs may enable computing modules 112 to reduce power consumption more rapidly than if notifications are provided via network 103. For example, the disclosed technology may enable computing modules 112 to reduce the draw on electrical circuit 106 within an overcurrent tolerance period during which power panel 120 continues to power electrical circuit 106 even though the draw on electrical circuit 106 is over a continuous current rating of the circuit breaker for electrical circuit 106. Computing modules 112 may thus avoid tripping the circuit breaker.

Fixture 110 may also include one or more power supplies 114 that are adapted to receive power from power panel 120 via electrical circuit 106 and to provide power to power bus 116 (e.g., to power computing modules 112). As shown, power supplies 114 are coupled in parallel between electrical circuit 106 and power bus 116. However, other power supplies may be coupled in any suitable arrangement. Also, power supplies 114 may also be adapted provide notifications to computing modules 112 via power supply notification signal 118 in response to a malfunction or other power supply failure. Such notifications may be provided via an interface of power supply 114.

Power supplies 114 may include AC to DC power supplies (e.g., rectifiers), DC to DC power supplies, AC to AC power supplies, DC to AC power supplies, transformers, surge protection units, and/or other suitable types of power supplies.

As shown, power panel 120 is adapted to receive power from primary power source 122 and/or secondary power source 124 and to power computing system 102 via electrical circuit 106. In addition, power panel 120 is also adapted to provide overcurrent notification signal 108 to computing system 102, e.g., to signal the occurrence of an overcurrent condition. As one example, power panel 120 may be adapted to detect when the current through electrical circuit 106 exceeds a threshold, and to assert overcurrent notification signal 108 in response to the detection. The threshold in this example may be based on a continuous current rating of the circuit breaker for electrical circuit 106.

When received by computing modules 112, this notification may serve as a power reduction signal and/or overcurrent notification, and may enable computing modules 112 to reduce the load on power supplies 114. This reduction may also reduce the draw on electrical circuit 106 to a level below the continuous current rating of the circuit breaker, and possibly avoid tripping the circuit breaker.

Power panel 120 is also adapted to receive power from primary power source 122 and/or secondary power source 124. Primary power source 122 may be, for example, an external power grid. However, primary power source 122 may also be another type of primary power source, e.g., a solar cell array, a wind power system, a geothermal power system, and/or the like. In addition, secondary power source 124 may include one or more batteries 126 and one or more generators 128. However, secondary power source 124 may also include any of a variety of power sources, e.g., fuel cells, solar cells, wind power systems, geothermal power systems, and/or the like. In one example, secondary power source 124 primarily services the facility at which computing system 102 is located. However, secondary power source 124 may service any number of facilities. For example, secondary power source 124 may be a secondary and/or backup power grid.

Figure 2:
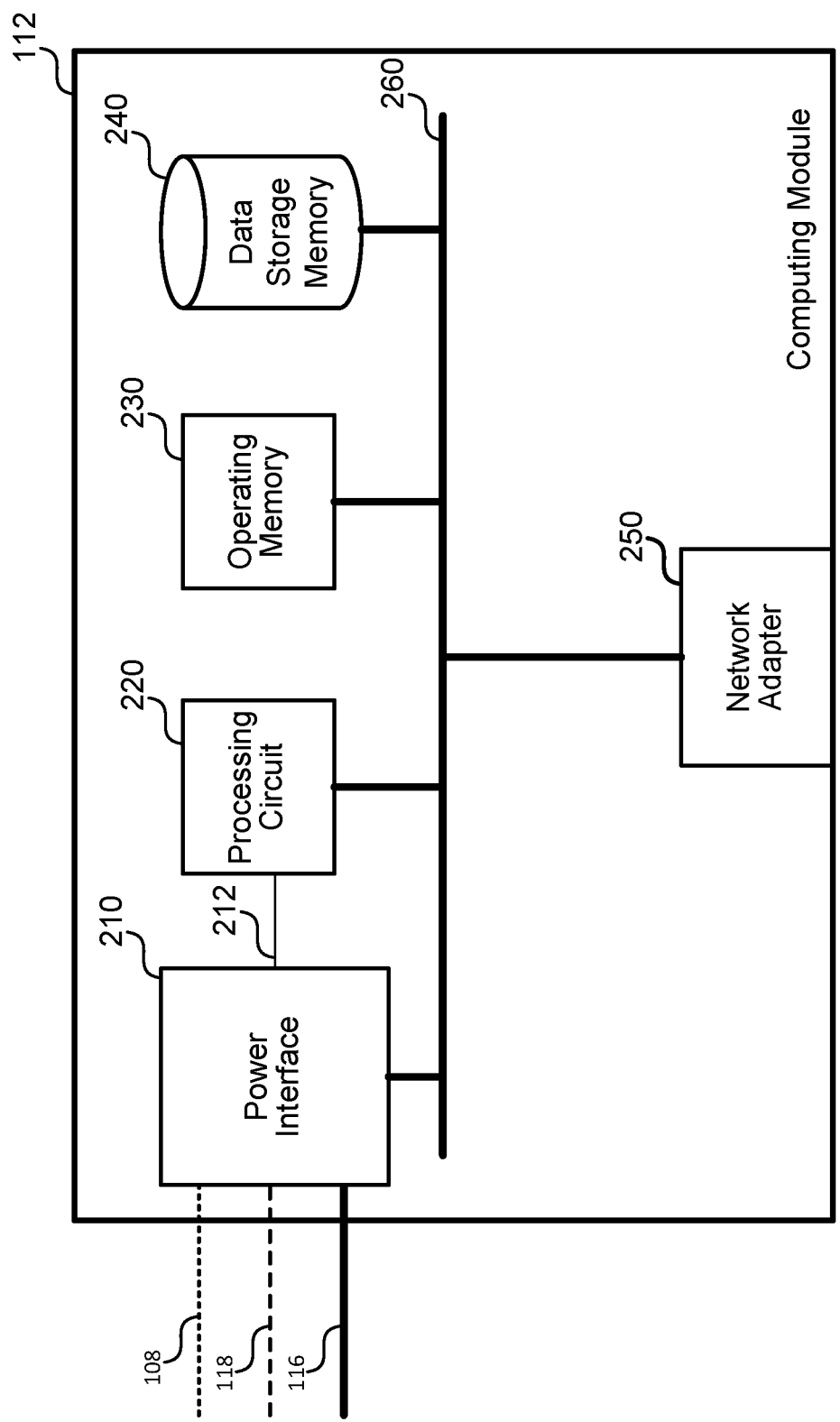
FIG. 2 is an block diagram illustrating certain components of a computing module in accordance with the disclosed technology.

FIG. 2 is a block diagram of computing module 112. As shown, computing module 112 includes power interface 210, processing circuit 220, operating memory 230, data storage memory 240, and network adapter 250. These components may be interconnected by bus 260.

In computing module 112, power interface 210 is adapted to interface the other components of computing module 112 to power supplies 114 and power panel 120. More specifically, power interface 210 is coupled to power bus 116, overcurrent notification signal 108, and power supply notification signal 118, and to processing circuit 220 via speed reduction signal 212 and bus 260.

Power interface 210 may be adapted to receive power from power bus 116 and distribute this power to the other components of computing module 112. In addition, power interface 210 may be adapted to control an operating speed associated with processing circuit 220. For example, power interface 210 may be adapted to reduce one or more operating speeds via assertion of speed reduction signal 212. Power interface 210 may also be adapted to control the one or more operating speeds by writing to one or more speed control registers of processing circuit 220 via bus 260.

This control over the one or more operating speeds may also be performed by power interface 210 in response to, or otherwise based on, a notification received from power panel 120 via overcurrent notification signal 108 and/or from power supplies 114 via power supply notification signal 118. For example, the notifications may indicate that an instantaneous current through a circuit breaker for electrical circuit 106 exceeds a continuous current rating of the circuit breaker, that another overcurrent condition has taken place on electrical circuit 106, that one of the power supplies 114 has failed, that multiple power supplies have failed, and/or the like.

Computing module 112 also includes processing circuit 220 which may be adapted to execute instructions, such as processor-executable or other computer-executable instructions. Processing circuit 220 may include a microprocessor and/or a microcontroller. In addition, processing circuit 220 may be adapted to execute instructions at a frequency, rate, or other speed that is based on whether speed reduction signal 212 is asserted and/or on value(s) of one or more speed control registers of processing circuit 220 (e.g., a processor frequency register, a memory speed register, one or more memory timing registers, one or more bus multiplier/divisor registers, one or more phase look loop control registers, a clock control register, etc.).

Processing circuit 220 may operate at a first frequency (e.g., a fail-safe frequency) if speed reduction signal 212 is asserted, but otherwise operate at a frequency defined by or otherwise associated with a value of a speed control register. Alternately or additionally, processing circuit 220 may also employ speed reduction signal 212 and/or a value of a speed control register to control other speeds, such as a bus speed, a memory speed, memory timing, a clock frequency, and/or the like.

Also, processing circuit 220 may be adapted to receive speed reduction signal 212 via a dedicated hardware interface. For example, a dedicated speed reduction interface may enable a speed associated with processing circuit 220 to be reduced with very little latency. As one example, a dedicated interface may be handled by processing circuit 220 without the intervention of a software exception handler. By way of examples, a dedicated interface may comprise a speed reduction pin of a processor, a speed reduction pin of a microcontroller, a disable pin of a phase lock loop, a enable pin of a clock divider, a temperature protection pin of a processor and/or a memory temperature protection pin of a processor, and/or the like.

Instructions, along with other data (e.g., datasets, metadata, etc.), may be stored in operating memory 230 and/or data storage memory 240. In one example, operating memory 230 is employed for run-time data storage while data storage memory 240 is employed for long-term data storage. However, each of operating memory 230 and data storage memory 240 may be employed for either run-time or long-term data storage. Each of operating memory 230 and data storage memory 240 may also include any of a variety of data storage devices/components, such as volatile memories, semi-volatile memories, non-volatile memories, random access memories, static memories, disks, disk drives, caches, buffers, or any other media that can be used to store information. However, operating memory 230 and data storage memory 240 specifically do not include or encompass communications media, any communications medium, or any signals per se. As eluded to above, operating memory 230 and/or data storage memory 240 may also be operated at speeds based on speed reduction signal 212 and/or values of one or more speed control register.

Also, computing module 112 may include or be coupled to any type of computer-readable media such as computer-readable storage media (e.g., operating memory 230 and data storage memory 240) and communication media (e.g., communication signals and radio waves). While the term computer-readable storage media includes operating memory 230 and data storage memory 240, this term specifically excludes and does not encompass communications media, any communications medium, or any signals per se.

Computing module 112 also includes network adapter 250 which may be adapted to interface computing module 112 to a network, e.g., network 103. Network adapter 250 may include a network interface card (NIC), a media access control (MAC) interface, a physical level interface (PHY), and/or the like. Network adapter 250 may also serve as an input and/or output interface for computing module 112.

Figure 3:
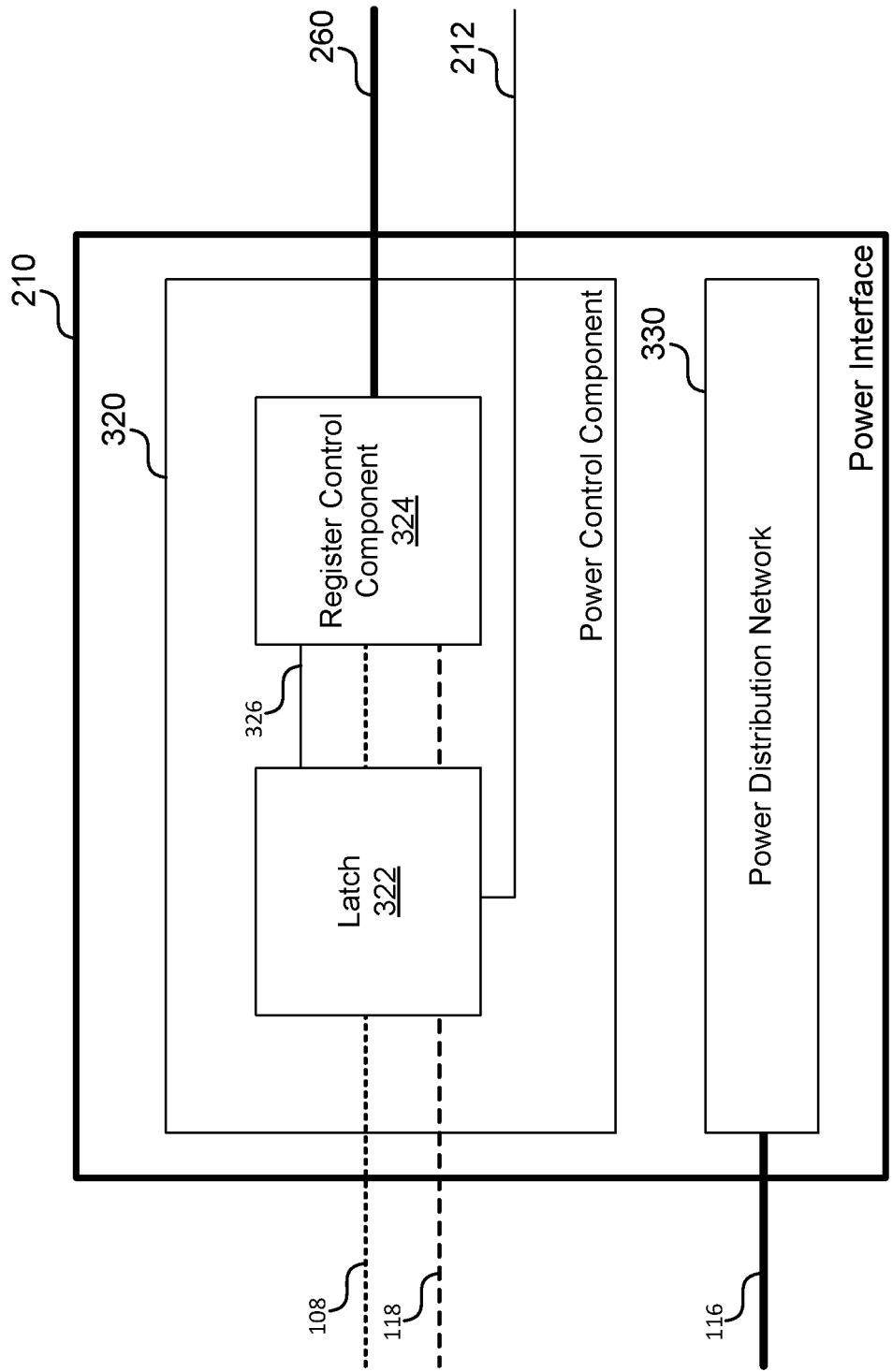
FIG. 3 is a block diagram illustrating certain components of a power interface of a computing module in accordance with the disclosed technology.

FIG. 3 is a block diagram illustrating of power interface 210. As shown in FIG. 3, power interface 210 includes power control component 320 and power distribution network 330.

Power control component 320 may be adapted to adjust one or more operating speeds of processing circuit 220. Moreover, the adjustment of one or more operating speeds may include multiple adjustments of the one or more operating speeds, for example, to provide a low latency response to an overcurrent condition followed with a more gradual return to normal or closer to normal operation. To facilitate these adjustments, power control component 320 may include latch 322 and register control component 324.

In the illustrated example, latch 322 is adapted to receive overcurrent notification signal 108 and power supply notification signal 118, latch the assertion of either signal, and drive speed reduction signal 212 while either signal is latched (e.g., to assert a speed reduction pin of processing circuit 220). In this example, latch 322 may include inputs for these notification signals, an OR gate adapted to logically OR these signals, and an SR latch with a set input coupled to the output of the OR gate. In addition, this example latch may also have a reset input coupled to register control component 324 via latch deassertion signal 326. However, this is merely one example of a suitable circuit.

In this example, when either overcurrent notification signal 108 and/or power supply notification signal 118 is asserted, latch 322 receives the asserted signal and causes a near instantaneous reduction of power consumption (e.g., within 4 to 6 milliseconds). In another example, speed reduction pins for computing modules 112 are asserted by latch 322 within 15 milliseconds of an overcurrent condition. As circuit breakers typically have overcurrent tolerance periods in the order of 100 milliseconds to 3 seconds, this low-latency reduction power reduction may enable the draw on electrical circuit 106 to be reduced before the circuit breaker would trip.

Power control component 320 may also include register control component 324 which may be adapted to write one or more speed control registers of processing circuit 220. Register control component 324 may also be adapted to release latch 322 by asserting latch deassertion signal 326 after writing the one or more speed control registers. The release of latch 322 may cause a frequency of processing circuit 220 to rise to a second frequency defined by a value written by register control component 324. This second frequency may be greater than the above-discussed first frequency (e.g., the fail-safe frequency), but may be less than a normal frequency for processing circuit 220. Also, the assertion of speed reduction signal 212 followed by writing one or more speed control registers and the deassertion of speed reduction signal 212 may enable processing circuit 220 to reach the second frequency faster than if the speed change was instructed only by writing the one or more speed control registers. Register control component 324 may be part of a chipset management controller, an auxiliary management controller, or a baseband management controller. However, register control component 324 may be part of any suitable component of computing module 112.

Power distribution network 330 may be adapted to receive power from power bus 116 and to distribute power to power control component 320 and the other components of computing module 112. For example, power distribution network 330 may include local power supplies, local wiring, circuit traces, interconnects, and/or the like (not shown).

Figure 4:
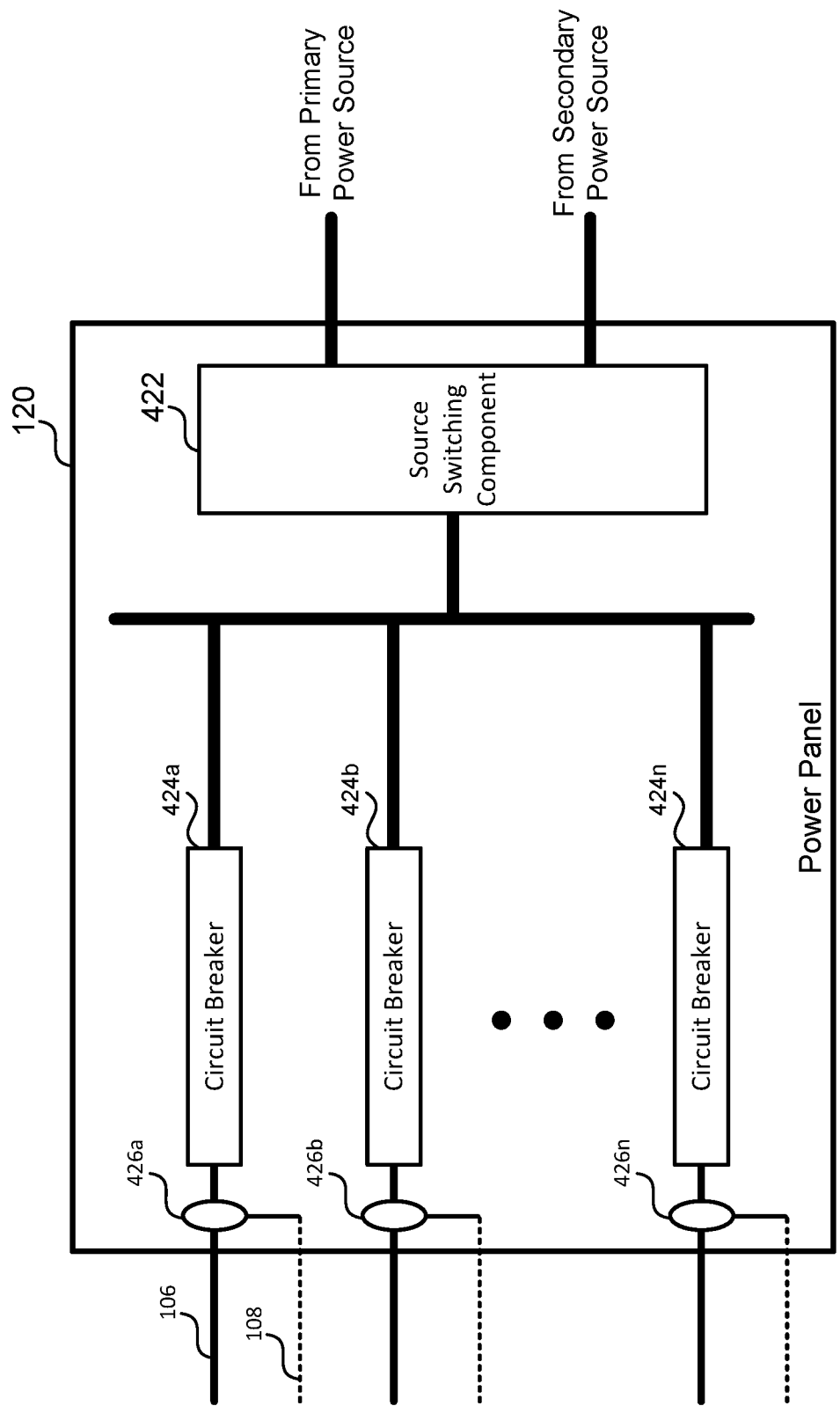
FIG. 4 is a block diagram illustrating an example of a power panel in accordance with the disclosed technology.

FIG. 4 is a block diagram illustrating power panel 120. As illustrated, power panel 120 includes source switching component 422, circuit breakers 424a-n, and power monitors 426a-n.

Source switching component 422 may interface power panel 120 to primary power source 122 and/or secondary power source 124. For example, source switching component 422 may include a transfer switch, synchronization circuitry, and/or the like, that enables power to be routed to computing system 102 from primary power source 122 and/or secondary power source 124. In addition, source switching component 422 may include filtering circuitry, transformers, surge protection circuitry, and/or the like. While source switching component 422 is shown as a component of power panel 120, source switching component 422 may be omitted from other examples of power panels (e.g., in power systems employing a single power source or that perform source switching at other power system locations).

Power panel 120 includes a plurality of circuit breakers 424a-n, e.g., each serving a corresponding electrical circuit. In the illustrated example, each of circuit breakers 424a-n is coupled to the output of source switching component 422 and is adapted to trip (e.g., disconnect the associated electrical circuit from source switching component 422) in the event of an overcurrent condition such as a short circuit, electrical fault, or other event that causes current of a greater magnitude than a rated capacity to be drawn through that circuit breaker. For example, circuit breaker 424a may be adapted to trip if a current greater than a continuous current rating is continuously drawn by electrical circuit 106 for longer than a overcurrent tolerance period. In addition, circuit breaker 424a may also be adapted to trip if a current greater than a maximum instantaneous current rating is drawn by electrical circuit 106, irrespective of how long that current is sustained. Generally, the maximum instantaneous current rating of a circuit breaker is greater than the continuous current rating for that circuit breaker.

Power monitors 426a-n may be adapted to monitor the currents through the corresponding circuit breakers 424a-n and to detect overcurrent conditions associated with that circuit breaker. Also, power monitors 426a-n may serve as signaling interfaces to provide notifications of detected overcurrent conditions. As discussed above, such notifications may be used by computing modules 112 to trigger a speed reduction and to reduce power consumption.

In addition to providing overcurrent notification signal 108 to computing modules 112, power monitor 426a may also provide overcurrent notification signal 108 to rack and/or chassis managers (not shown) associated with racks and/or chassis powered by the electrical circuit 106. In such an example, the rack and/or chassis managers may be responsible for restoring computing modules 112 to normal operating speed after the end of an overcurrent condition. In addition, the rack and/or chassis managers may wait a suitable time after the end of an overcurrent condition before restoring normal operations. In one example, a rack and/or chassis manager may employ a watchdog or other timer to track a time period after an overcurrent condition before the rack and/or chassis manager attempts to restore computing modules 112 to a normal operating speed.

Although power monitors 426a-n are illustrated as being on the output of circuit breakers 424a-n, other power monitors may be located on the inputs of circuit breakers, at a first load on associated electrical circuits, or at any other suitable location. Alternately, power monitors may also be integrated into circuit breakers, e.g., into smart breakers.

Figure 5:
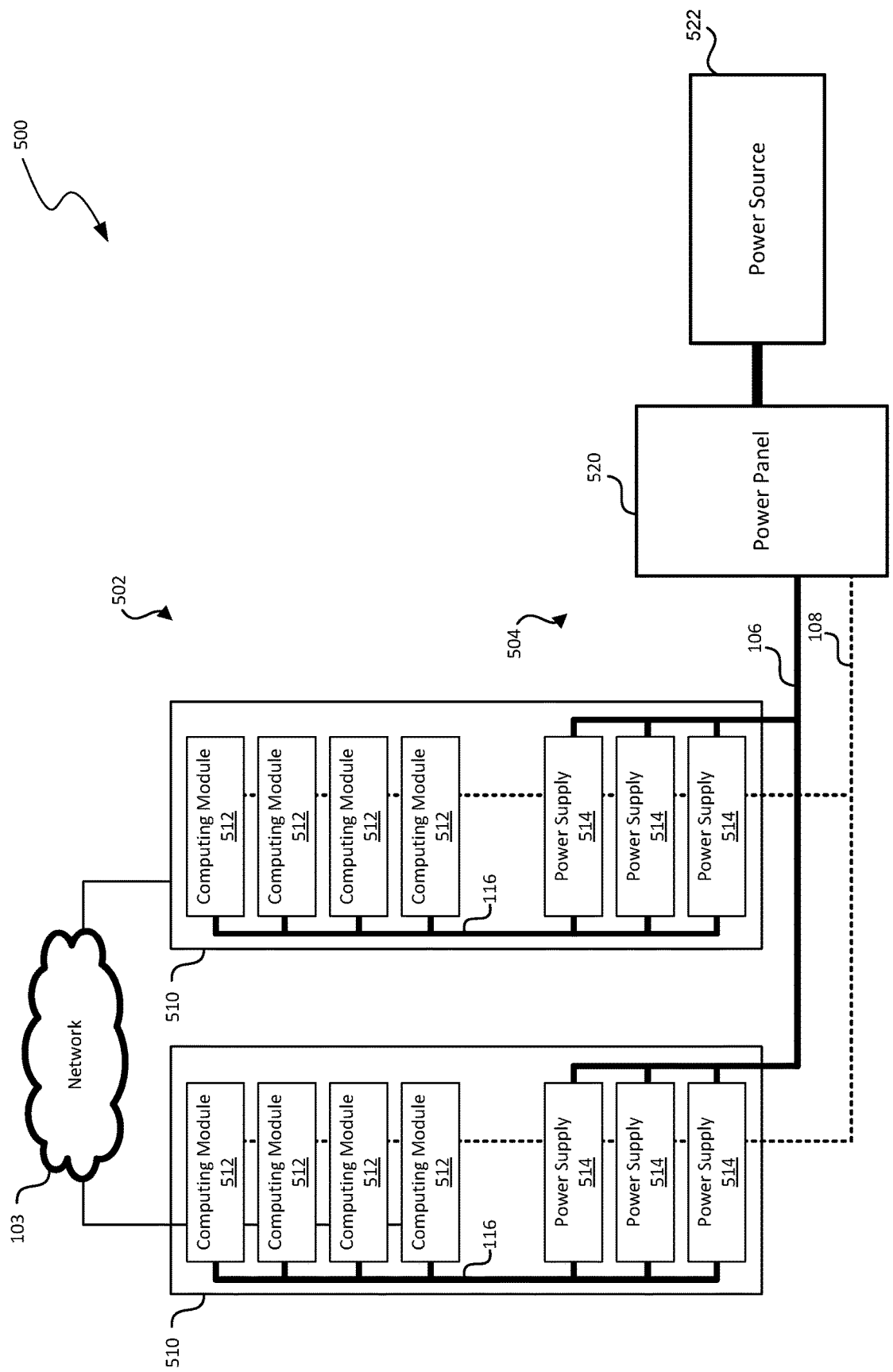
FIG. 5 is a block diagram illustrating another example environment in accordance with the disclosed technology.

FIG. 5 is a block diagram illustrating environment 500 in accordance with the disclosed technology. Power system 504 may be generally similar in structure and function to power system 104 of FIG. 1 except that power system 504 may include only a single power source 522, and power panel 520 may be adapted for operation with only a single power supply. Likewise, computing system 502 may be generally similar in structure and function to computing system 102 of FIG. 1 except that computing system 502 includes two fixtures 510, and power supplies 514 do not provide a separate power supply notification signal to computing modules 512. Rather, power supplies 514 might not provide power supply failure notifications to computing modules 512, or power supply failure notifications may be provided via overcurrent notification signal 108 (e.g., via use of tri-state outputs, multiplexing, etc.). Although four computing modules and three power supplies per fixture are illustrated in FIGS. 1 and 5, any suitable quantity of number of computing modules and/or power supplies may be included in other fixtures.

Figure 7:
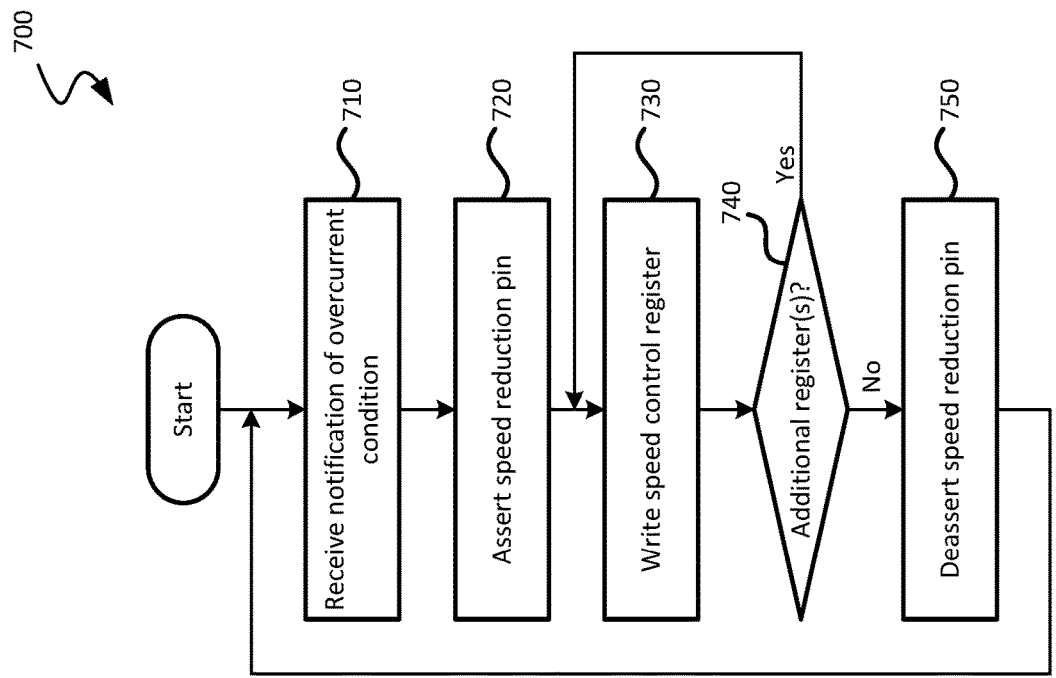
FIG. 7 is a logical flow diagram illustrating a process for reducing the power consumption of a computing module in accordance with the disclosed technology.
Figure 6:
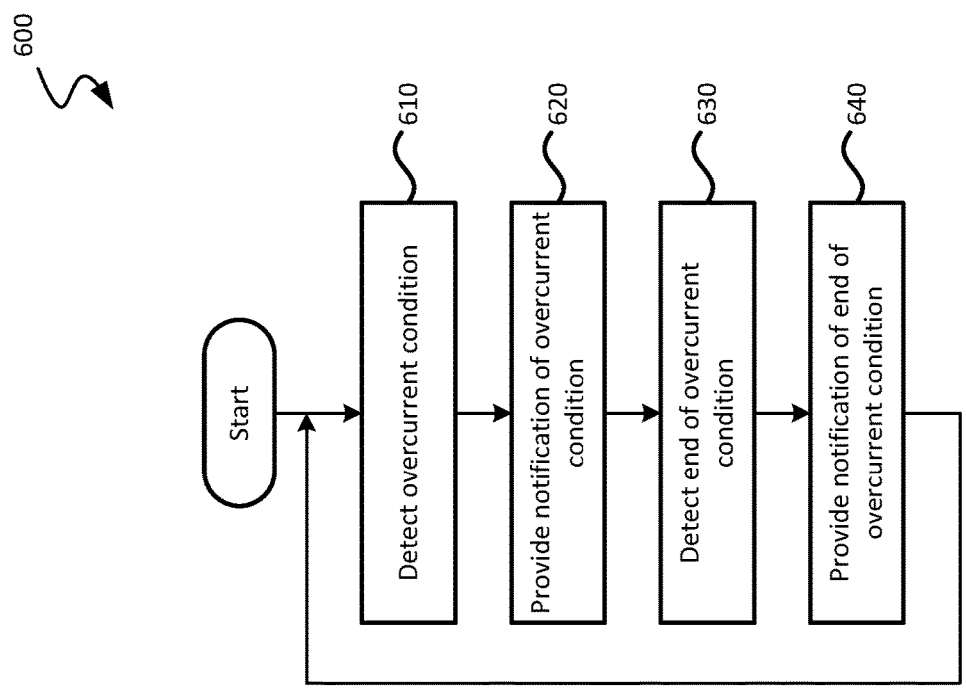
FIG. 6 is a logical flow diagram illustrating a process for providing overcurrent condition notifications in accordance with the disclosed technology.

FIG. 6 is a logical flow diagram illustrating process 600 for providing overcurrent condition notifications, and FIG. 7 is a logical flow diagram illustrating process 700 for reducing the power consumption of a computing module. For clarity, these processes are described in terms of operations performed in particular sequences by particular devices or components of a system. However, other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein.

These processes may also be embodied in a variety of ways. For example, they may be embodied on an article of manufacture, e.g., as computer-readable instructions stored in a computer-readable storage medium or be performed as a computer-implemented process or computer-controlled process. As an alternate example, these processes may be encoded as computer-executable instructions and transmitted via a communications medium. As another alternative, these processes and/or other technology described herein may be implemented in hardware. For example, this technology may be implemented in whole or in part in an application specific integrated circuit (ASIC), a field programmable gate array (FPGA), a programmable logic device (PLD), discrete logic, and/or the like.

Process 600 begins at 610 where power monitor 426a detects that the current through circuit breaker 424a for electrical circuit 106 exceeds a threshold, such as a continuous current rating for circuit breaker 424a. In response to the detection, processing flows from 610 to 620.

At 620, power monitor 426a provides a notification of the detected overcurrent condition to computing modules 112 of fixture 110. For example, 620 may include transmitting, by power monitor 426a, a power reduction signal to each computing module 112 powered by electrical circuit 106. As discussed above, this notification may be provided to computing modules 112 via dedicated signals, e.g., dedicated wiring, interfaces, pins, hardware, and/or the like. From 620, processing flows to 630.

At 630, power monitor 426a detects the end of the overcurrent condition. For example, the end of the overcurrent condition may be when the current through circuit breaker 424a drops below the continuous current rating for circuit breaker 424a. In response to the detection, processing flows from 630 to 640.

At 640, power monitor 426a provides a notification of the end of the overcurrent condition to computing modules 112. In addition, this notification may also be provided to rack and/or chassis managers, as discussed above in conjunction with FIG. 4. From 640, processing returns to 610.

As noted above, FIG. 7 is a logical flow diagram illustrating process 700 for reducing the power consumption of a computing module. Process 700 begins at 710, where a notification of an overcurrent condition is received by computing module 112. The notification received at 710 may be the notification transmitted by power monitor 426a at 620 of process 600. In addition, this notification may be received by multiple computing modules 112 (e.g., multiple computing devices may concurrently perform process 700). In response to this notification, computing module 112 may begin reducing power consumption as processing flows to 720.

At 720, a speed control pin of processing circuit 220 is asserted, e.g., by power interface 210. This assertion of the speed control pin may include latching an assertion of overcurrent notification signal 108, and assertion of the speed control pin by latch 322 via speed reduction signal 212. From 720, processing flows to 730.

At 730, a speed control register of processing circuit 220 is written, e.g., by register control component 324. As discussed above, this write may be to a processor frequency register, a memory speed register, one or more memory timing registers, one or more bus multiplier/divisor registers, one or more phase look loop control registers, and/or the like. From 730, processing flows to 740.

At 740, it is determined whether additional speed control registers are to be written. If so, processing returns to 730. Otherwise, processing continues to 750.

At 750, the speed control pin of processing circuit 220 is deasserted, e.g., by clearing latch 322 via assertion of latch deassertion signal 326. The deassertion of the speed control signal may enable a frequency of processing circuit 220 to rise to a second frequency defined by a value written to a speed control register at 730. From 750, processing returns to 710.

While the above Detailed Description describes certain embodiments of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific embodiments disclosed herein, unless the Detailed Description explicitly defines such terms. Accordingly, the actual scope of the technology encompasses not only the disclosed embodiments, but also all equivalent ways of practicing or implementing the technology.

We claim:

1. A method of managing power in a multi-server computing system, the method comprising:
   detecting an occurrence of a current exceeding a threshold in a circuit that supplies power to multiple computing modules of the multi-server system; and
   in response to detecting the occurrence, reducing power consumption of at least two computing modules of the multiple computing modules, wherein reducing the power consumption for each of the at least two computing modules includes:
      asserting a speed reduction pin of a processor of that computing module, the assertion of the speed reduction pin causing the processor to operate at a first operating frequency that is less than a normal operating frequency for the processor; and
      while the speed reduction pin of the processor is asserted, writing a speed control register of the processor of that computing module with a value representing an operating frequency for the processor that is between the first operating frequency and the normal operating frequency for the processor.

2. The method of claim 1, wherein:
   the threshold is based on a continuous current rating for a circuit breaker through which the circuit is powered; and
   the circuit continues to supply power to the multiple computing modules while the power consumption is being reduced.

3. The method of claim 1, wherein the speed reduction pin for each of the at least two computing modules is asserted within 15 milliseconds of the occurrence.

4. The method of claim 1, wherein the speed reduction pin is at least one of a processor temperature protection pin or a memory temperature protection pin.

5. The method of claim 1, wherein the assertion of the speed reduction pin enables the processor to carry out a speed change operation instructed via the write to the speed control register faster than another speed change operation instructed via another write to the speed control register without a corresponding assertion of the speed reduction pin.

6. The method of claim 1, further comprising:
   in response to detecting the occurrence, transmitting, by a power panel through which the circuit is powered, a power reduction signal to each of the at least two computing modules; and
   receiving, by each of the at least two computing modules, the power reduction signal, wherein:
   the occurrence is detected by a power monitor; and
   the reducing of the power consumption of the at least two computing modules is also in response to receiving the power reduction signal.

7. The method of claim 1, wherein the operating frequency includes at least one of a bus speed, a memory speed, a clock frequency, or a processor frequency.

8. An apparatus, comprising:
   a memory and a processor that are respectively configured to store and execute instructions, including instructions for causing the apparatus to perform operations for managing power in a multi-server computing system, the operations comprising:
      detecting that a current in a circuit that supplies power to multiple computing modules of the multi-server system exceeded a threshold; and
      in response to the detection, reducing power consumption of at least two computing modules of the multiple computing modules, wherein reducing the power consumption for each of the at least two computing modules includes:
         asserting a speed reduction pin of a processor of that computing module, the assertion of the speed reduction pin causing an operating frequency of the processor to drop to a first operating frequency that is less than a normal operating frequency for the processor; and
         while the speed reduction pin of the processor is asserted, writing a speed control register of the processor of that computing module with a value representing an operating frequency for the processor that is between the first operating frequency and the normal operating frequency for the processor.

9. The apparatus of claim 8, wherein:
   the threshold is based on a continuous current rating for a circuit breaker through which the circuit is powered; and
   the circuit continues to supply power to the multiple computing modules while the power consumption is being reduced.

10. The apparatus of claim 8, wherein the speed reduction pin for each of the at least two computing modules is asserted within 15 milliseconds of the occurrence.

11. The apparatus of claim 8, wherein the speed reduction pin is at least one of a processor temperature protection pin or a memory temperature protection pin.

12. The apparatus of claim 8, wherein the assertion of the speed reduction pin enables the processor to carry out a speed change operation instructed via the write to the speed control register faster than another speed change operation instructed via another write to the speed control register without a corresponding assertion of the speed reduction pin.

13. The apparatus of claim 8, further comprising:
   in response to detection, transmitting, by a power panel through which the circuit is powered, a power reduction signal to each of the at least two computing modules; and
   receiving, by each of the at least two computing modules, the power reduction signal, wherein:
   the occurrence is detected by a power monitor; and
   the reducing of the power consumption of the at least two computing modules is also in response to receiving the power reduction signal.

14. The apparatus of claim 8, wherein the operating frequency includes at least one of a bus speed, a memory speed, a clock frequency, or a processor frequency.

15. An apparatus, comprising:
   a power distribution network coupled to a power bus;
   a memory adapted to store computer-executable instructions;
   a processing circuit adapted to execute the computer-executable instructions; and
   a power control component adapted to adjust an operating frequency of the processing circuit in response to an overcurrent notification signal, the power control component being further adapted to adjust the operating frequency of the processing circuit by:
      reducing the operating frequency to a first frequency via an assertion of a speed reduction pin of the processing circuit; and
      writing a value to a speed control register associated with the processing circuit while the speed reduction pin of the processing circuit is asserted, the value enabling the operating frequency to increase to a second frequency, wherein the second frequency is between the first frequency and a normal frequency of the processing circuit.

16. The apparatus of claim 15, wherein the overcurrent notification signal is based on an instantaneous current through a circuit breaker for the electrical circuit exceeding a continuous current rating of the circuit breaker.

17. The apparatus of claim 15, wherein:
the power control component is further adapted to adjust the operating frequency of the processing circuit in response a power supply failure notification.

18. The apparatus of claim 15, wherein the power control component is further adapted to reduce the operating frequency to the first frequency via a dedicated speed reduction interface of the processing circuit.

19. The apparatus of claim 15, wherein the power control component includes:
a latch circuit having a first input coupled to the overcurrent notification signal, the latch circuit being adapted to latch the overcurrent notification signal and to assert the speed reduction pin of the processing circuit while the overcurrent notification signal is latched; and
a register control component that is adapted to write the value to the speed control register and to release the latched overcurrent notification signal after the value has been written to the speed control register.

20. The apparatus of claim 15, wherein the operating frequency includes at least one of a bus speed, a memory speed, a clock frequency, or a processor frequency.

* * * * *